United States Patent [19]

Holmes

[11] 4,154,270
[45] May 15, 1979

[54] SHOCK SUPPRESSOR RESERVOIR BLEED AND FILL SYSTEM AND METHOD

[75] Inventor: Lloyd H. Holmes, Salt Lake City, Utah

[73] Assignee: E-Systems, Inc., Dallas, Tex.

[21] Appl. No.: 902,876

[22] Filed: May 4, 1978

[51] Int. Cl.² ............................................. B65B 3/04
[52] U.S. Cl. ........................................ 141/1; 141/98; 141/231
[58] Field of Search .............................. 141/231, 1-12, 141/46-68, 100-107, 367, 392, 98, 83

[56] References Cited
U.S. PATENT DOCUMENTS 2,435,747  2/1948  Larson .................................. 141/66

*Primary Examiner*—Houston S. Bell
*Attorney, Agent, or Firm*—Robert V. Wilder

[57] ABSTRACT

A bleed and fill system apparatus and method for in line servicing of shock suppressor reservoirs is provided. Vacuum and fluid canisters are mounted to a backpack that can be carried by maintenance personnel to the locations of shock suppressors. The apparatus includes a valve for attachment to the reservoir of the shock suppressor. Fluid lines interconnect the valve to the canisters. The valve is operable to independently connect either the vacuum canister or the fluid canister to the reservoir of the shock suppressor, such that when the vacuum canister is connected to the reservoir, air is bled from the fluid lines and connections to the shock suppressor and when the fluid canister is connected to the reservoir, fluid enters the reservoir to replace lost fluid. The system thereby permits in line servicing of shock suppressors without removal of the shock suppressor from its housing and mountings.

8 Claims, 1 Drawing Figure

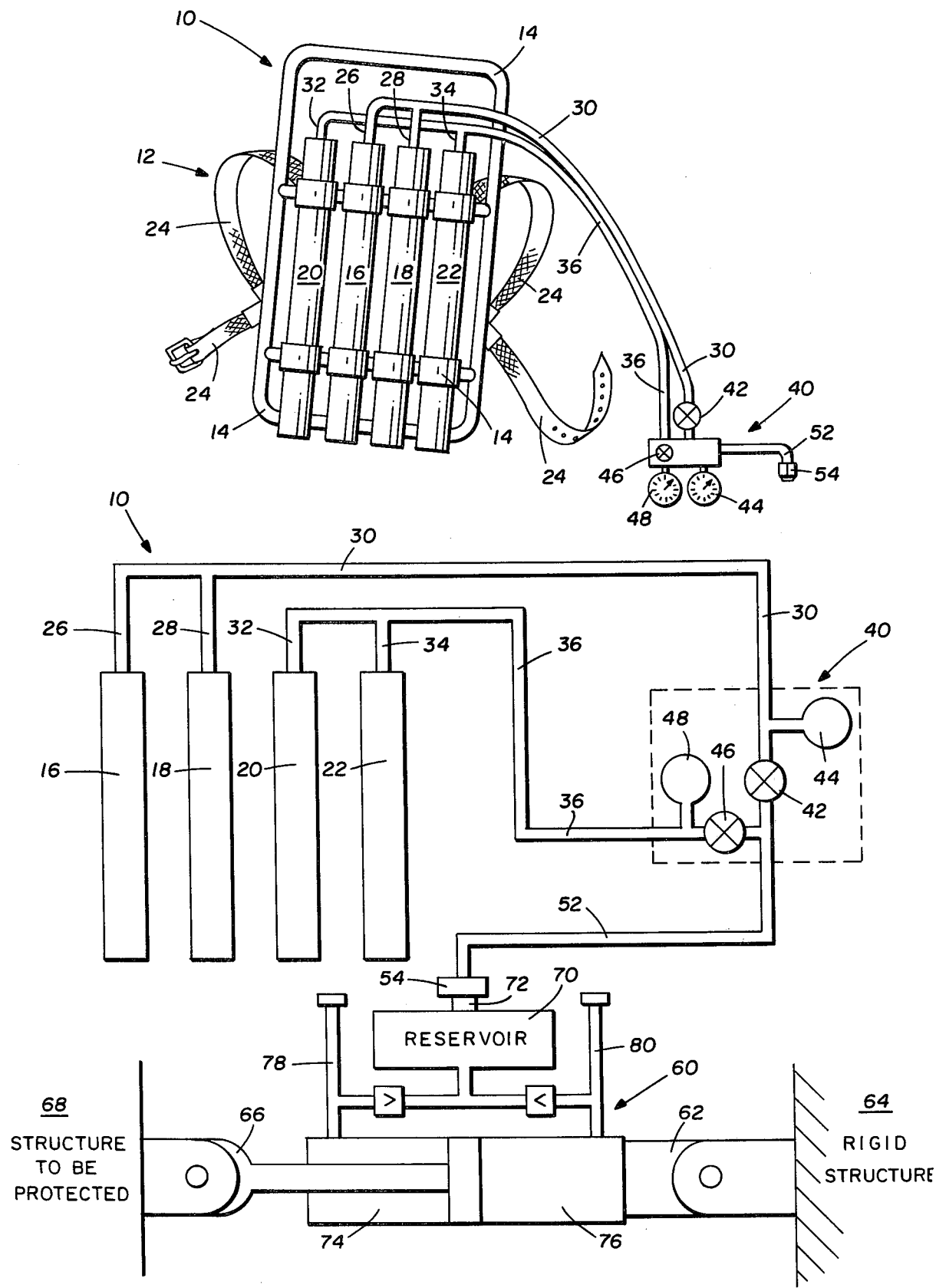

SHOCK SUPPRESSOR RESERVOIR BLEED AND FILL SYSTEM AND METHOD

FIELD OF THE INVENTION

This invention relates to bleed and fill assemblies, and more particularly to a portable bleed and fill assembly that permits in line servicing of shock suppressor reservoirs.

THE PRIOR ART

Shock suppressors including hydraulically operated shock suppressors or snubbers are typically utilized in power plants to maintain large pieces of equipment in place should there be a blowout or other explosive malfunction within the power plant system. A crucial operating parameter of a snubber is the requirement that the fluid reservoir be maintained at its proper level. The maintenance and filling of the fluid reservoirs of snubbers is a time consuming and periodic maintenance requirement within power plants.

Heretofore, the requirement of servicing and maintaining the fluid levels of snubber reservoirs necessitated the removal of the snubber from its housing and mounting for servicing on off line test benches. The removal of the snubber from its in line operation required that portion of the power plant which utilized the snubber to remain out of service until servicing of the snubber was completed. The amount of time the portion of the power plant was out of service created an intolerable situation in that the operation of the power plant was dictated by such things as servicing non-power related equipment.

A need has thus arisen for a bleed and fill assembly for use with shock suppressors, such as hydraulic shock suppressors for in line servicing of the fluid reservoirs associated with these shock suppressors. Such a bleed and fill assembly must be transportable to the site of a shock suppressor within a power plant system such that the maintenance and servicing of reservoirs can be performed without removing the shock suppressor from its operating location.

SUMMARY OF THE INVENTION

In accordance with the present invention, a system and method is provided for servicing the reservoir of a shock suppressor without the necessity of removing the shock suppressor from its housing and mounting, to enable the performance of in line maintenance.

In accordance with the present invention, a portable bleed and fill system for servicing the reservoir of a shock suppressor includes a vacuum canister and a fluid canister containing replacement reservoir fluid. A valve is provided for attachment to the reservoir of the shock suppressor. Fluid lines interconnect the canisters to the valve assembly. The valve assembly is operable to independently and alternately connect either one of the canisters to the reservoir of the shock suppressor. When the vacuum canister is connected to the reservoir, air is bled from the fluid lines and connections to the shock suppressor. When the fluid canister is connected to the reservoir, fluid enters the reservoir to replace lost fluid. The system thereby permits in line servicing of shock suppressors without removal of the shock 20 suppressor from its housing and mountings.

In accordance with another aspect of the present invention, a method of servicing the reservoir of a shock suppressor is provided and includes transporting a vacuum canister and a fluid canister containing replacement reservoir fluid to the operating location of the shock suppressor. A valve assembly is interconnected to the bleed and fill fitting of the shock suppressor without disrupting normal operation of the shock suppressor. The valve assembly is operated to interconnect the vacuum canister to the shock suppressor, thereby bleeding air from the fitting and fluid lines of the shock suppressor. The valve assembly is then operated to interconnect the fluid canister to the shock suppressor to force fluid from the fluid canister into the shock suppressor to replace lost reservoir fluid. The valve assembly is then disconnected from the bleed and fill fitting and the system is removed from the operating location of the shock suppressor.

DESCRIPTION OF THE DRAWINGS

A more complete understanding of the invention and its advantages will be apparent from the following detailed description taken in conjunction with the accompanying drawings in which:

FIG. 1 is a perspective view of the present bleed and fill system; and

FIG. 2 is a block diagram of the present bleed and fill system interconnected to a reservoir of a shock suppressor.

DESCRIPTION OF THE PREFERRED EMBODIMENT

FIG. 1 illustrates the bleed and fill system of the present invention and is generally identified by the numeral 10. Bleed and fill system 10 includes a backpack assembly generally identified by the numeral 12 to permit bleed and fill system 10 to be carried on the back of maintenance personnel to the operating location of a shock suppressor to be serviced. Backpack assembly 12 includes a frame 14 for mounting canisters 16, 18, 20 and 22. Frame 14 may comprise, for example, lightweight aluminum tubing or other material to provide a structurally sound support frame that is lightweight to insure portability. Backpack assembly 12 further includes straps 24 for fastening backpack assembly 12 to the body of the workman.

Canisters 16 and 18 contain filtered and deaerated reservoir fluid and may comprise, for example, piston type or bladder type accumulator canisters. Canisters 16 and 18 are interconnected by fluid lines 26 and 28 to a main fluid line 30. Canisters 20 and 22 are evacuated to a pressure of approximately 2 psia in the preferred embodiment. Vacuum lines 32 and 34 interconnect canisters 20 and 22 to a main vacuum line 36. Although two fluid canisters 16 and 18 and two vacuum canisters 20 and 22 have been illustrated in the preferred embodiment, alternatively, the number of canisters can be varied to accommodate the needed volume of fluid and vacuum necessary for the desired length of time the canisters can be used without recharging. Canisters 16, 18, 20 and 22 may be spring or air charged.

Main fluid line 30 and main vacuum line 36 are interconnected to a filler valve assembly generally identified by the numeral 40. Main fluid line 30 is interconnected through a valve 42 to filler valve assembly 40. Valve 42 may comprise, for example, a needle valve and is manually operable by the maintenance personnel in servicing the reservoir of a shock suppressor. Associated with main fluid line 30 and valve 42 is a pressure gauge 44 for monitoring the amount of fluid contained within canisters 16 and 18. Main vacuum line 36 is interconnected through a valve 46 to filler valve assembly 40. Valve 46 may comprise, for example, a push-to-open type valve. Associated with main vacuum line 36 and valve 46 is a pressure gauge 48. Filler valve assembly 40 also includes an output line 52 and a fitting 54 for mating with the bleed and fill fitting of the shock suppressor reservoir.

FIG. 2 illustrates the interconnection of the present bleed and fill system 10 to a shock suppressor generally identified by the numeral 60. An end 62 of shock suppressor 60 is mounted to a rigid structure 64. An end 66 of shock suppressor 60 is interconnected to a structure 68 to be protected, such as a pipe or other structure susceptible to movement in the event of an explosion or excessive vibration. Shock suppressor 60 further includes a reservoir 70 including bleed and fill fitting 72. Associated with the retract and extend cavities, 74 and 76, of shock suppressor 60 are 25 port valves 78 and 80.

In operation of the present bleed and fill system 10, backpack 12 is carried by a workman to the operating location of a snubber to be serviced. It will be appreciated that due to the compact size of backpack assembly 12, the bleed and fill system 10 can be easily transported by a workman through doorways, elevated locations, passageways, stairwells and other structures encountered in a power plant while servicing installed shock suppressors. Fitting 54 of valve assembly 40 is interconnected to bleed and fill fitting 72 of shock suppressor 60. The operator observes the reading on pressure gauge 48 to determine the initial vacuum pressure in the bleed and fill system 10. Push-to-open valve 46 is then actuated and held open until pressure gauge 48 again reads the steady state vacuum pressure level. The operation of valve 46 clears all air and excess fluid from main vacuum line 36, line 52 and fittings 54 and 72. Push-to-open valve 46 is then closed to maintain the vacuum in the system 10 and shock suppressor 60.

Once the bleed and fill system 10 and shock suppressor 60 have been interconnected and the fluid lines evacuated to maintain the existing pressure within shock suppressor 60 to permit it to continue normal operation, bleed and fill fitting 72 is opened to connect reservoir 70 of shock suppressor 60 through output line 52 to valve 42. Valve 42 is opened by the workman to permit fluid contained under pressure in canisters 16 and 18 to flow via main fluid line 30 through valve 42 to output line 52 into reservoir 70. The amount of replacement fluid necessary to fill reservoir 70 to its proper volume is monitored by the reservoir fluid level indicator (not shown) mounted to shock suppressor 60.

After the proper reservoir fluid level has been achieved within reservoir 70, valve 42 is closed and bleed and fill fitting 72 is closed. Push-to-open valve 46 is actuated and held open while fitting 54 is loosened allowing output line 52 to be cleared of residual fluid. Fitting 54 is then disconnected from bleed and fill fitting 72. The servicing operation of shock suppressor 60 is then completed without the necessity of removing shock suppressor 60 from its in line operation. The maintenance personnel can then relocate to another site within the power plant to perform maintenance and service on additional shock suppressors.

It therefore can be seen that the present bleed and fill system permits the in line servicing and maintenance of reservoirs of shock suppressors. The bleed and fill system is mounted to a backpack assembly for portability in transporting the system to shock suppressor operating locations.

While only one embodiment of the present invention has been described in detail herein and shown in the accompanying drawings, it will be evident that various further modifications are possible without departing from the scope of the invention.

What is claimed is:

1. A portable bleed and fill system for servicing the reservoir of a shock suppressor mounted for in line operation comprising:
   a vacuum canister;
   a fluid canister;
   a backpack means for carrying said canisters;
   valve means for attachment to the reservoir of the shock suppressor;
   means for interconnecting said canisters to said valve means; and
   said valve means being operable to independently and alternatively connect either one of said canisters to the reservoir of the shock suppressor, such that when said vacuum canister is connected to the reservoir, air is bled from said valve means and when said fluid canister is connected to the reservoir, replacement fluid enters the reservoir to replace lost fluid to thereby permit in line servicing of the shock suppressor without removal of the shock suppressor from its housing and mountings.

2. The portable bleed and fill system of claim 1 wherein said canisters are mounted to a frame member to be carried by an operator to the operating site of the shock suppressor.

3. The portable bleed and fill system of claim 1 wherein said valve means for attachment to the reservoir of the shock suppressor includes:
   a first valve means interconnected to said vacuum canister for selectively controlling the interconnection of said vacuum canister to the reservoir of the shock suppressor for bleeding air from said valve means and said means interconnecting said canisters to said valve means; and
   a second valve means for selectively controlling the interconnection of said fluid canister to the reservoir for filling the reservoir of the shock suppressor.

4. The portable bleed and fill system of claim 1 and further including:
   means for monitoring the pressure of the vacuum created within the bleed and fill system; and
   means for monitoring the amount of fluid contained within said fluid canister.

5. A method of servicing the reservoir of a shock suppressor mounted for in line operation comprising:
   transporting a vacuum canister and a fluid canister containing replacement reservoir fluid to the operating location of the shock suppressor;
   interconnecting a valve assembly, connected to said canisters, to the bleed and fill fitting of the shock suppressor without interrupting normal operation of the shock suppressor;
   operating said valve assembly to interconnect said vacuum canister to the shock suppressor, thereby bleeding air from the fitting and lines of the shock suppressor;
   operating said valve assembly to interconnect said fluid canister to the shock suppressor reservoir to force fluid from said fluid canister into the shock suppressor reservoir to replace lost fluid;
   disconnecting said valve assembly from the bleed and fill fitting of the shock suppressor; and removing said canisters and valve assembly from the operating location of the shock suppressor.

6. The method of claim 5 wherein the step of operating said valve assembly to interconnect said fluid canister to the shock suppressor further includes:

operating said valve assembly to disconnect said vacuum canister from the shock suppressor.

7. The method of claim 5 and further including:

monitoring the amount of fluid contained in said fluid canister.

8. The method of claim 5 and further including:

monitoring the pressure of the vacuum created within the shock suppressor prior to operating said valve assembly to interconnect said fluid canister to the reservoir of the shock suppressor.

* * * * *